Aug. 17, 1954   M. SADOWSKY   2,686,734
METHOD OF COATING WATER SENSITIVE PHOSPHOR SCREENS
Filed Jan. 23, 1952
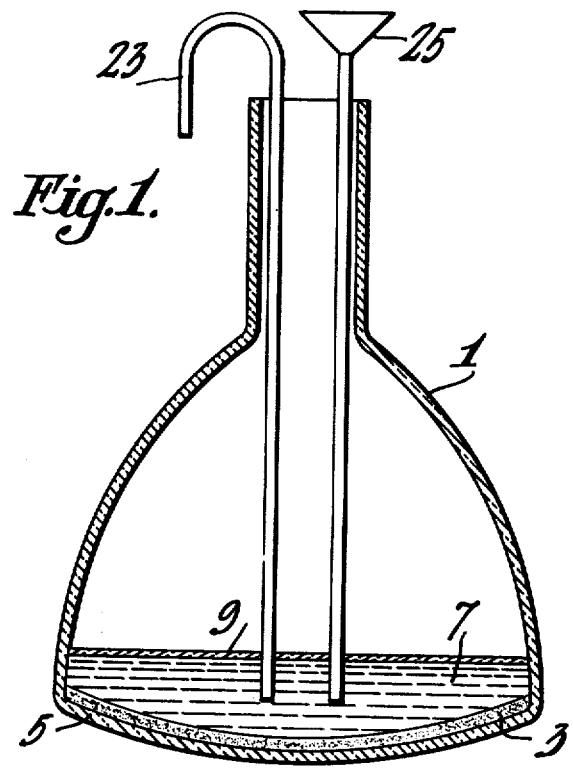
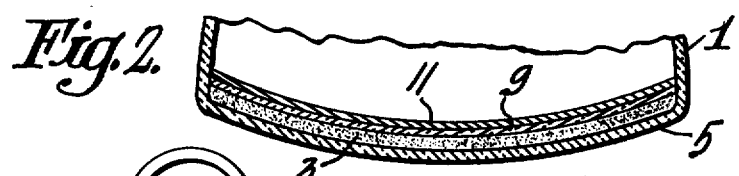
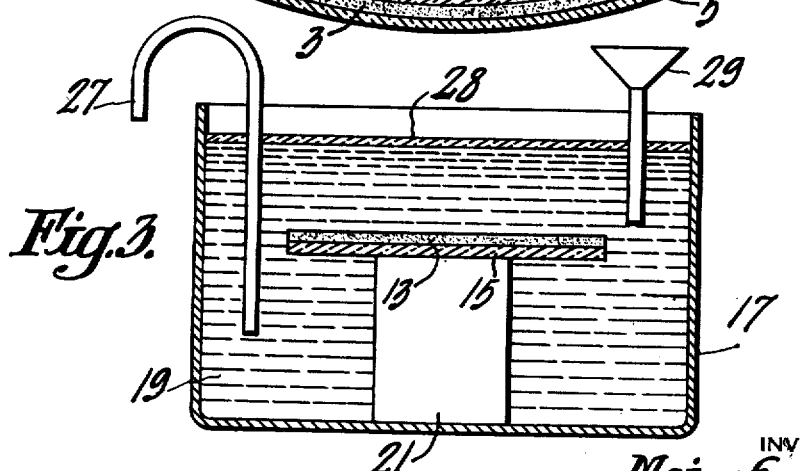
INVENTOR
Meier Sadowsky
BY
William A. Balcak
ATTORNEY Patented Aug. 17, 1954

2,686,734

UNITED STATES PATENT OFFICE 2,686,734

METHOD OF COATING WATER SENSITIVE PHOSPHOR SCREENS

Meier Sadowsky, Elkins Park, Pa., assignor to Radio Corporation of America, a corporation of Delaware Application January 23, 1952, Serial No. 267,864

8 Claims. (Cl. 117—33.5)

My invention relates to cathode ray tubes of the type having fluorescent screens and in particular to the method of making such screens.

In certain types of cathode ray tubes using an electron beam for producing luminescence in a phosphor screen, it has proved advantageous to cover the phosphor screen inside the tube with a thin, electron pervious, light reflecting layer. Such a layer, which may be made of metal or some other suitable conductive material, provides a mirror surface to intensify the luminescent light of the phosphor screen. That is, light from the screen which tends to pass into the tube envelope and be lost to an observer, is reflected by the metallic film and intensifies the useful light passing through the tube face to an observer. Other advantages are also obtained by the use of such a phosphor screen having a backing layer. Light that normally goes back into the tube is not completely absorbed by the conventional black internal coating and some of it is scattered back to the screen to light up dark areas. The metal or other coating prevents all light from going back into the bulb and results in an improvement in contrast. Furthermore, the metal coating absorbs the negative ion component of the scanning electron beam and prevents its destructive bombardment of the phosphor screen. Also, the function of the film as a conductive coating improves resolution. In addition, phosphors which would not ordinarily be useful due to poor secondary emission properties can be used with a metal backing.

The film commonly used is an aluminum coating evaporated on the phosphor screen. However, other coatings having the desired optical and electrical properties are satisfactory. To produce a good reflecting mirror, the surface of the aluminum film in contact with the phosphor screen should be of mirror smoothness. Due to the irregular surface presented by the phosphor crystals it is a well known practice to lay down a transparent lacquer or plastic film over the phosphor to provide a smooth foundation layer for the deposition of the aluminum or backing coating. Many difficulties have arisen in successfully laying down the lacquer film and rather complicated procedures are involved.

According to general practice, after the phosphor screen has been deposited on the face of a cathode ray tube, an organic film is deposited on a cushion layer of water which is then removed in order to spread the film directly on the phosphor screen. Then the backing coating is applied to the film. However, it is clear that in cathode ray tubes which have water soluble screens such a process, using a water cushion layer, cannot be used. Accordingly, some liquid which does not react with the phosphor screen or with the film must be used as a cushion layer. The possibility of using an organic medium immediately presents itself. The situation is complicated by the fact that most low boiling organic liquids will react with or unduly attract the plastic film or its solvents. On the other hand, a very dense organic medium which will provide suitable flotation of the film requires such a high temperature for volatilization that the phosphor screen may thereby be destroyed.

Accordingly, the principal object of my invention is to provide a novel method of coating a phosphor screen with a conductive, light reflecting film.

Another object of my invention is to provide a novel method of depositing a plastic or organic film on a phosphor screen.

A further object is to provide a novel method of coating phosphor screens without adversely affecting the screen or any of the agents employed in the method.

Another object is to provide methods of the above-indicated nature which can be used with screens employing water soluble phosphors.

In general, I accomplish the objects of my invention by providing a cushion layer of a dense organic material over the phosphor screen. Such material will ordinarily have a high boiling point. I then spread the desired organic film over the cushion layer. I next substitute, in part or completely, a low boiling point organic material for the high boiling point organic substance. I then draw the organic film down onto the phosphor screen by removing the cushion layer which now comprises either a low boiling point organic medium or a combination of low and high boiling point organic fluids. I then metallize or otherwise coat the film-covered screen in conventional fashion.

My invention will be described in detail with reference to the drawings wherein:

Fig. 1 shows a cathode ray tube having a phosphor screen which has been treated according to certain of the steps of my method;

Fig. 2 shows a portion of a cathode ray tube having a phosphor screen which has been provided with a conductive backing coating according to my invention; and, Fig. 3 shows an arrangement of apparatus for carrying out certain of the steps of my invention.

Referring to the drawings, Figure 1 shows a cathode ray tube 1 having a phosphor screen 3 settled on the glass face 5 thereof. This invention may employ a screen of water sensitive phosphor material such as potassium chloride or magnesium sulfide which dissociates on contact with water. Because of the water sensitivity of the phosphor screen, conventional methods of applying a conductive, light reflecting layer to the screen itself cannot be employed. I have, therefore, devised the following method which may be applied to water sensitive phosphors, for metallizing or otherwise coating a phosphor screen.

According to the first step of my invention, a cushion layer 7 of a dense organic liquid is introduced into the cathode ray tube so that it covers the phosphor screen. The organic agent chosen must not contain a radical which reacts with the plastic film material to be used and it must also be dense enough to float the film on its surface. I prefer to employ high boiling point alcohols for this purpose since the low boiling point alcohols react with the film material and are not dense enough to support the film. Ethylene glycol is a typical member of the group. However, other alcohols of a similar adequate density may be used. Some of the other suitable agents are glycerine, di-propylene glycol, di-ethylene glycol, etc. Also aliphatic hydrocarbons of the proper density to allow flotation of the organic film may be used.

Next a thin film 9 of organic substance, e. g. a plastic or lacquer is spread over the cushion layer 7 by any suitable method. One such method is described in the Sadowsky application, Serial No. 742,117, filed April 17, 1947, now U. S. Patent No. 2,625,493, and assigned to the assignee of this application. The particular organic material of which the film is composed is selected because of its immiscibility with the other organic agents employed in the process. One suitable substance, e. g. for use with ethylene glycol, is isobutyl methacrylate dissolved to suitable viscosity in toluene and acetone.

After the film has completely spread over the cushion layer 7 and hardened thereon so that it may be supported by a less dense medium, a low boiling point organic agent which will ordinarily be of less density is substituted partially or completely for the high boiling point substance in the cushion layer. This is done so that removal of the cushion layer will be simplified in that it will readily evaporate off at the temperature used to remove the plastic film. Thus the temperature needed for removing the plastic film and the remainder of the cushion layer may be a low and safe temperature for the phosphor screen. Here again, the agent is selected for its immiscibility with the film material. One suitable low boiling point agent is methanol. However, other immiscible agents of similar or adequately low boiling point could be used. I have found that such low boiling point agents, e. g. the alcohols, will not react to any great extent with the hardened plastic film. This substitution step may be effected in many ways.

According to one arrangement illustrated in Fig. 1, a siphon 23 or similar device is inserted into the cushion layer 7 whereby the dense substance in the cushion layer may be removed. At the same time a long-stem funnel 25 is similarly inserted below the plastic film and the low boiling point agent is introduced thereby. The substitution may be either partial or complete and it may be carried out at any reasonable rate. It is not essential that the rate of introduction of fluid equal the rate of removal to avoid disturbing the film since the operation is effected while it is still in extensible condition.

Another method is illustrated in Figure 3 wherein a phosphor screen is deposited on a flat base plate 15. The screen-bearing plate is placed in a container 17 and submerged in a bath 19 of the high boiling point organic agent. The plate 15 may be positioned on a support member 21. A plastic or lacquer film 28 is spread over the surface of the liquid 19. A siphon 27 or other suitable device is inserted into the bath to remove the high boiling point agent and at the same time a funnel type device 29 is inserted to introduce a low boiling point agent. Here too, the substitution may be either partial or complete.

Another method of substituting organic media comprises lifting the screen and film from the high boiling point alcohol cushion layer and depositing both in a dish of methanol.

After the methanol has been substituted either partially or completely in the cushion layer, the film is drawn down onto the phosphor screen by siphoning off or decanting the cushion layer. One suitable method for carrying out this process is shown in the above-identified application, Serial Number 742,117. As the cushion layer is removed, the film settles into intimate contact with the phosphor screen and provides a smooth surface on which metallizing or other coating procedures may be effected.

According to the next step in the procedure the screen 3 and contacting film 9 are dried and then the desired coating 11 of light reflecting conductive material, for example aluminum, is deposited thereon in conventional and well known fashion. Such a screen having the various coatings deposited thereon is shown in Fig. 2.

Finally the metallized or coated screen is baked in order to remove the plastic film and the coating procedure is thus complete. As above described, since the cushion layer ultimately comprised comparatively low boiling point material, the plastic film and the remains of the cushion layer may be baked out at a temperature which does not disturb the phosphor screen.

What I claim is:

1. A method of spreading a film of lacquer on a phosphor screen and then coating the screen, comprising the steps of depositing a liquid pool of high boiling point alcohol over said phosphor screen, said high boiling point alcohol being immiscible and non-reactive with said film of lacquer to be spread on said screen, spreading said film of lacquer over said pool, allowing said film to harden, replacing at least a part of said high boiling point alcohol with low boiling point alcohol immiscible with said lacquer, removing the contents of said pool and bringing said film into contact wth said screen and applying a coating on said film.

2. A method of coating a phosphor screen comprising the steps of depositing a liquid layer of high boiling point alcohol over said screen, spreading a film of lacquer immiscible in said alcohol over said liquid layer, allowing said film to harden, replacing said high boiling point alcohol with low boiling point alcohol immiscible with said lacquer, removing said layer and bringing said layer into contact with said screen, and applying a coating on said film.

3. A method of coating a phosphor screen comprising the steps of depositing a layer of ethylene glycol over said screen, spreading a film of lacquer immiscible in ethylene glycol over said layer, allowing said film to harden, replacing at least a part of said ethylene glycol in said layer with a low boiling point alcohol immiscible with said lacquer, removing said layer and bringing said film into contact with said screen, and applying a conductive coating on said film.

4. A method of coating a phosphor screen comprising the steps of depositing a pool of ethylene glycol over said screen, spreading a film of lacquer immiscible in ethylene glycol and methanol over said pool, allowing said film to harden, replacing at least a part of said ethylene glycol in said pool with methanol, removing said pool and bringing said film into contact with said screen, and applying a conductive coating on said film.

5. A method of coating a water sensitive phosphor screen comprising the steps of depositing a layer of ethylene glycol over said screen, spreading a film of lacquer immiscible in ethylene glycol and methanol over said layer, substituting methanol in part for said ethylene glycol in said layer after said film has hardened, removing said layer and bringing said film of lacquer into contact with said screen, applying a conductive coating on said film, and removing said film of lacquer from said screen.

6. A method of aluminizing a cathode ray tube having a water sensitive phosphor screen, said method comprising the steps of depositing a pool of ethylene glycol over said screen, spreading a solution of isobutyl methacrylate over said pool to form a film, allowing said film to harden, replacing said ethylene glycol at least partly with methanol, removing said pool by decantation and bringing said film into contact with said screen, evaporating a thin coating of aluminum onto said film and then baking said tube to remove said film.

7. A method of aluminizing a water sensitive phosphor screen, said method comprising the steps of depositing a pool of high boiling point alcohol over said phosphor screen, spreading a film of lacquer immiscible in said alcohol on said layer, substituting a low boiling point alcohol immiscible with said lacquer in part for said high boiling point alcohol after said film of lacquer has hardened, removing said pool and bringing said film of lacquer into contact with said phosphor screen, depositing a conductive coating of aluminum on said film of lacquer, and then removing said film of lacquer by heat.

8. A method of aluminizing a cathode ray tube having a water sensitive phosphor screen, said method comprising the steps of depositing a pool of ethylene glycol over said screen, depositing a small amount of a solution of isobutyl methacrylate on said pool to form a film thereon, allowing said film to harden, removing at least a part of said ethylene glycol by siphoning and replacing said ethylene glycol by methanol, removing said pool by decantation and bringing said film into contact with said screen, evaporating an aluminum coating on said film, and then baking said film to remove said film from said screen.

References Cited in the file of this patent

UNITED STATES PATENTS

| Number | Name | Date |
|---|---|---|
| 2,328,292 | Painter | Aug. 21, 1943 |
| 2,402,900 | Koller | June 25, 1946 |
| 2,421,208 | Leverenz | May 27, 1947 |
| 2,421,979 | Bachman et al. | June 10, 1947 |